United States Patent

Devenyi

[11] Patent Number: 5,955,806
[45] Date of Patent: Sep. 21, 1999

[54] TORQUE MOTOR WITH COMBINED SHIELD RING AND ROTOR RING

[75] Inventor: Gabor Devenyi, Penetang, Canada

[73] Assignee: Raytheon Company, Lexington, Mass.

[21] Appl. No.: 08/566,205

[22] Filed: Dec. 1, 1995

[51] Int. Cl.[6] .......................... H02K 1/06; H02K 33/16; H02F 7/08
[52] U.S. Cl. .......................... 310/156; 310/36; 310/254; 310/67 R; 310/266; 354/271.1
[58] Field of Search ................. 310/67 R, 266, 310/265, 267, 268, 254, 12, 13, 14, 15, 156, 36; 354/271.1, 451, 452

[56] References Cited

U.S. PATENT DOCUMENTS

| | | | |
|---|---|---|---|
| 3,178,599 | 4/1965 | Krupick et al. | 310/154 |
| 3,636,392 | 1/1972 | Gerry | 310/67 |
| 3,663,850 | 5/1972 | Phelon | 310/153 |
| 4,355,249 | 10/1982 | Kenwell | 310/67 R |
| 4,378,146 | 3/1983 | Suzuki et al. | 354/271.1 |
| 4,417,167 | 11/1983 | Ishii et al. | 310/67 R |
| 4,460,253 | 7/1984 | Kawai et al. | 354/271.1 |
| 4,847,712 | 7/1989 | Crapo | 310/268 |
| 4,998,034 | 3/1991 | Hashimoto et al. | 310/67 R |
| 5,004,944 | 4/1991 | Fisher | 310/266 |
| 5,081,388 | 1/1992 | Chen | 310/266 |
| 5,140,212 | 8/1992 | Iwasaki et al. | 310/191 |
| 5,233,250 | 8/1993 | De Filippis | 310/156 |
| 5,289,066 | 2/1994 | Clark | 310/67 R |
| 5,493,157 | 2/1996 | Nakamura | 310/67 R |

FOREIGN PATENT DOCUMENTS

| | | | |
|---|---|---|---|
| 360533 | 2/1921 | Germany | 310/156 |
| 406141500 | 5/1992 | Japan | 310/266 |
| 338518 | 7/1959 | Switzerland | 310/266 |

*Primary Examiner*—Nestor Ramirez
*Assistant Examiner*—B. Mullins
*Attorney, Agent, or Firm*—W. C. Schubert; G. H. Lenzen, Jr.

[57] ABSTRACT

A torque motor includes an annular, cylindrically symmetric support base, and a plurality of electromagnet coils affixed to the support base at regular intervals around a cylindrical circumference of the support base. There is additionally an annular, generally cylindrical, rotationally movable rotor ring overlying the support base and having an inner surface, and a plurality of permanent magnets affixed to the inner surface of the rotor ring at regular intervals around a cylindrical circumference of the rotor ring. The number of permanent magnets is even and equal to the number of electromagnet coils, and the permanent magnets are arranged in alternating polarities around the circumference of the rotor ring. In a preferred form, there are six of each type of magnet, spaced equidistantly around the circumference of the respective rings.

21 Claims, 3 Drawing Sheets

TORQUE MOTOR WITH COMBINED SHIELD RING AND ROTOR RING

BACKGROUND OF THE INVENTION

This invention relates to a torque motor and, more particularly, to a torque motor having a combined shield ring and rotor ring.

A mechanical actuator is a device that controllably produces a mechanical movement. The mechanical actuator is typically connected to another device which requires such a movement for its proper operation. Mechanical actuators can be designed to produce linear, rotational, or other types of movements, as required, and the present invention deals with a rotational actuator or torque motor.

One type of torque motor includes a set of electromagnet rotor coils affixed to a stationary annular support ring in a symmetric configuration. A set of corresponding permanent magnets is affixed to a rotationally movable shaft lying within the support ring, with the permanent magnets in a generally facing but angularly displaced relationship to the electromagnet rotor coils. A ferromagnetic stationary flux shield overlies the annular support ring.

This conventional torque motor is operable, but has limitations resulting from its design. The inventor has recognized that the flux shield magnetically reacts with the magnetic field produced by the rotating permanent magnets due to induced magnetic coupling. This magnetic coupling reduces the efficiency of the torque motor by a substantial amount.

There is a need for an improved approach to the design of a torque motor having improved efficiency. The present invention fulfills this need, and further provides related advantages.

SUMMARY OF THE INVENTION

The present invention provides a torque motor with improved efficiency, within the same size envelope as prior torque motors. Alternatively, the torque motor can be built smaller and lighter than conventional torque motors, but with the same torque performance. The improved efficiency leads to lower heat production in service. The preferred torque motor of the invention achieves substantially linear performance over about ±7.5° (about 15° total) of rotational movement, which is sufficient for many practical applications of interest.

In accordance with the invention, a torque motor comprises a generally cylindrical support base, and at least one electromagnet coil affixed to the support base. There is, additionally, an annular, rotationally movable rotor ring overlying the support base, and at least two permanent magnets affixed to the rotor ring.

In a preferred embodiment, a torque motor comprises an annular, generally cylindrical support base, and a plurality of electromagnet coils affixed to the support base at regular intervals around a circumference of the support base. The torque motor further includes an annular, generally cylindrical, rotationally movable rotor ring overlying the support base and having an inner surface, and a plurality of permanent magnets affixed to the inner surface of the rotor ring at regular intervals around a circumference of the rotor ring. The number of permanent magnets is even (as distinct from "odd") and equal to the number of electromagnet coils, with the permanent magnets being arranged in alternating polarities around the circumference of the rotor ring. Preferably, there are six permanent magnets, each subtending an arc of from about 30 degrees to about 50 degrees, and six electromagnet coils.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
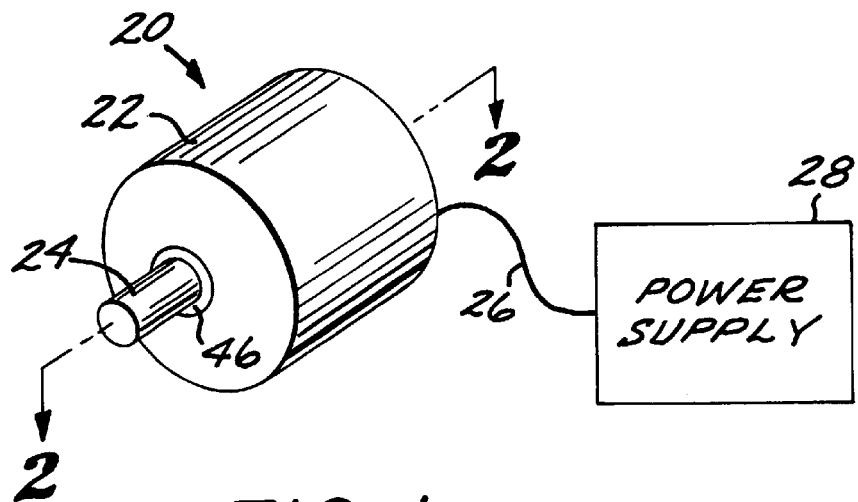
FIG. 1 is a perspective view of a torque motor according to the invention, with the outer housing removed.

FIG. 1 depicts a torque motor 20, with its external housing removed. The torque motor 20 includes an annular, rotationally movable rotor ring 22 and a smaller diameter rotating shaft 24 integral with the rotor ring 22 and extending therefrom along its axis of rotation. Leads 26 for electromagnets (not visible in FIG. 1, but discussed subsequently) within the interior of the torque motor 20 extend therefrom to a power supply 28.

Figure 2:
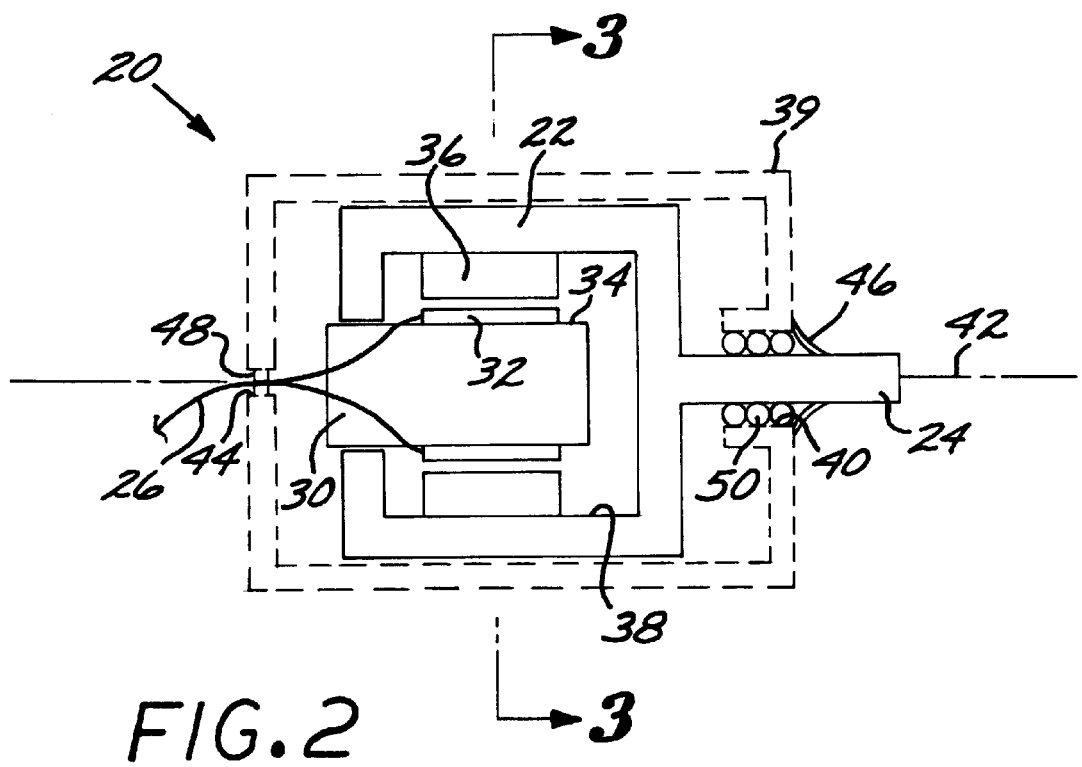
FIG. 2 is a schematic sectional view, taken generally along lines 2—2 of FIG. 1, of the torque motor.

FIG. 2 is a side sectional view of the torque motor 20. The torque motor 20 includes a generally cylindrical support base 30. As used herein, "generally cylindrical" means that the element is in the form of a cylinder or hollow cylinder, as will be understood from the context, but may vary from a purely cylindrical shape as long as the variation does not interfere with the operation of the element. The support base 30 is preferably made of aluminum or reinforced plastic.

Overlying the support base 30 is the rotor ring 22, which is rotationally movable relative to the support base 30. (In any application, one of the support base 30 and the rotor ring 22 is fixed or stationary, and the other is rotationally movable.) The rotor ring 22 is in the form of a generally cylindrical annulus having an inner cylindrical diameter larger than the outer cylindrical diameter of the support base 30. The rotor ring 22 is made of a ferromagnetic material, such as iron or steel. The rotor ring 22 serves as an external flux shield and magnetic field return path.

Figure 4:
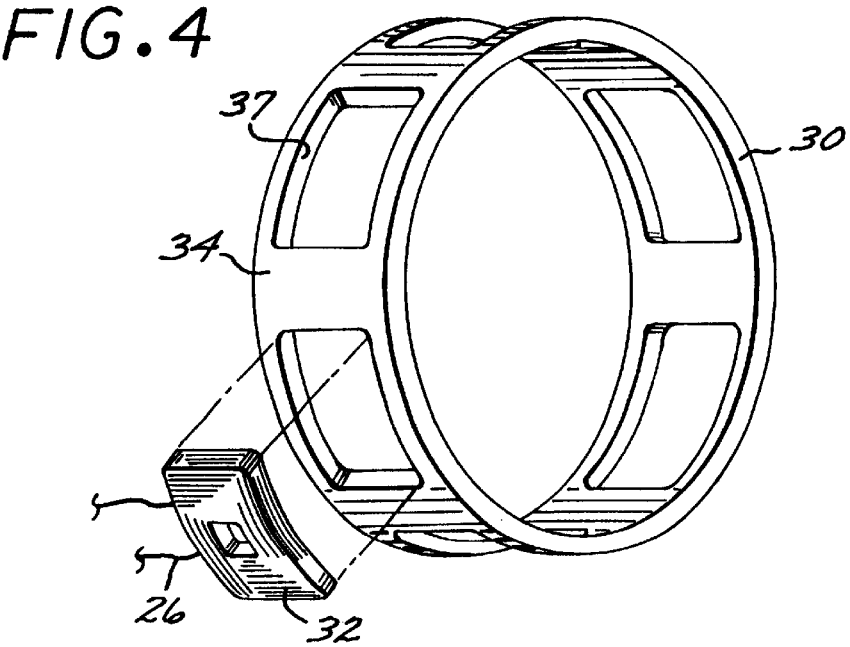
FIG. 4 is a perspective exploded view of a support base used in the torque motor of FIG. 1.
Figure 5:
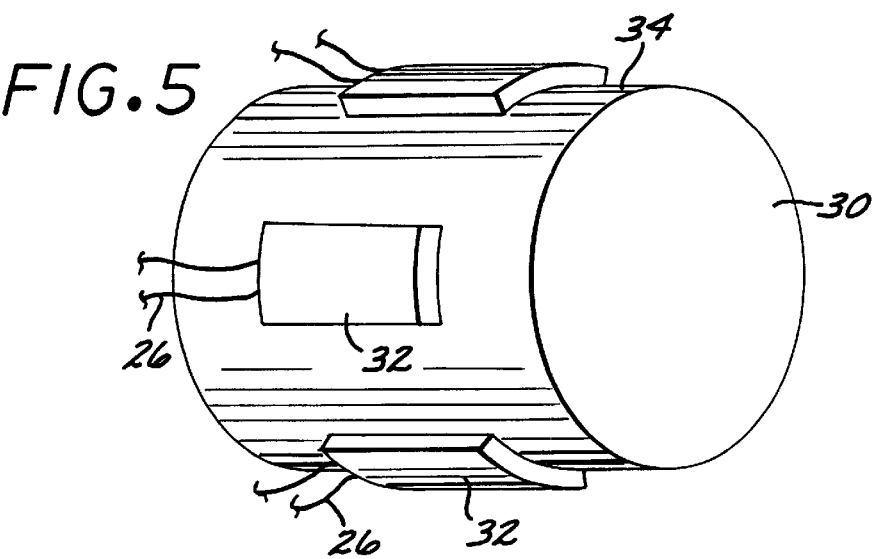
FIG. 5 is a perspective exploded view of another embodiment of the support base.

At least one, and preferably six, electromagnets 32, each in the form of multi-turn electromagnet flat coils, are supported on a cylindrical surface 34 of the support base 30, preferably equidistantly around the circumference of the surface 34. FIGS. 4 and 5 depict two operable configurations of the support base. In FIG. 4, the support base 30 is a hollow cylinder with windows 37 therethrough. Each electromagnet 32 is affixed to the cylindrical surface of the support base 30 in one of the windows 37, as with an adhesive. In this approach, each electromagnet 32 is substantially flush with the cylindrical surface 34. In FIG. 5, the support base 30 is a solid cylinder, with the electromagnets 32 affixed to the cylindrical surface 34. In this approach, each electromagnet 32 projects above the cylindrical surface 34. Other approaches can be used, as, for example, where the support base has recesses in its cylindrical surface, and the electromagnets are affixed in the recesses.

Each electromagnet 32 is generally flat, but slightly curved to conform to the curvature of the cylindrical surface 34. As shown in FIGS. 2, 4, and 5, the leads 26 from the electromagnet 32 extend along the length of the support base 30 and to the exterior of the torque motor 20.

At least two, and preferably six, permanent magnets 36 are affixed to an inner surface 38 of the rotor ring 22, preferably equidistantly around the circumference of the surface 38. The permanent magnets 36 are generally flat and thin, and are preferably curved to conform to the shape of the inner surface of the rotor ring 22.

A cover or housing 39 is desirably placed overlying the rotor ring 22. An opening 40 along a cylindrical axis 42 of the housing 38 permits the shaft 24, which is attached to the rotor ring 22, to pass out of the housing 38. Another opening 44 passes the leads 26 from the interior of the housing 38. The openings may be provided with seals to exclude contaminants and corrosive agents from the torque motor 20, such as a rubber rotating seal 46 between the shaft 24 and the opening 40 and a grommet-type seal 48 between the leads 26 and the opening 44. A bearing 50 supports the rotor ring 22 in the housing 39.

Figure 3:
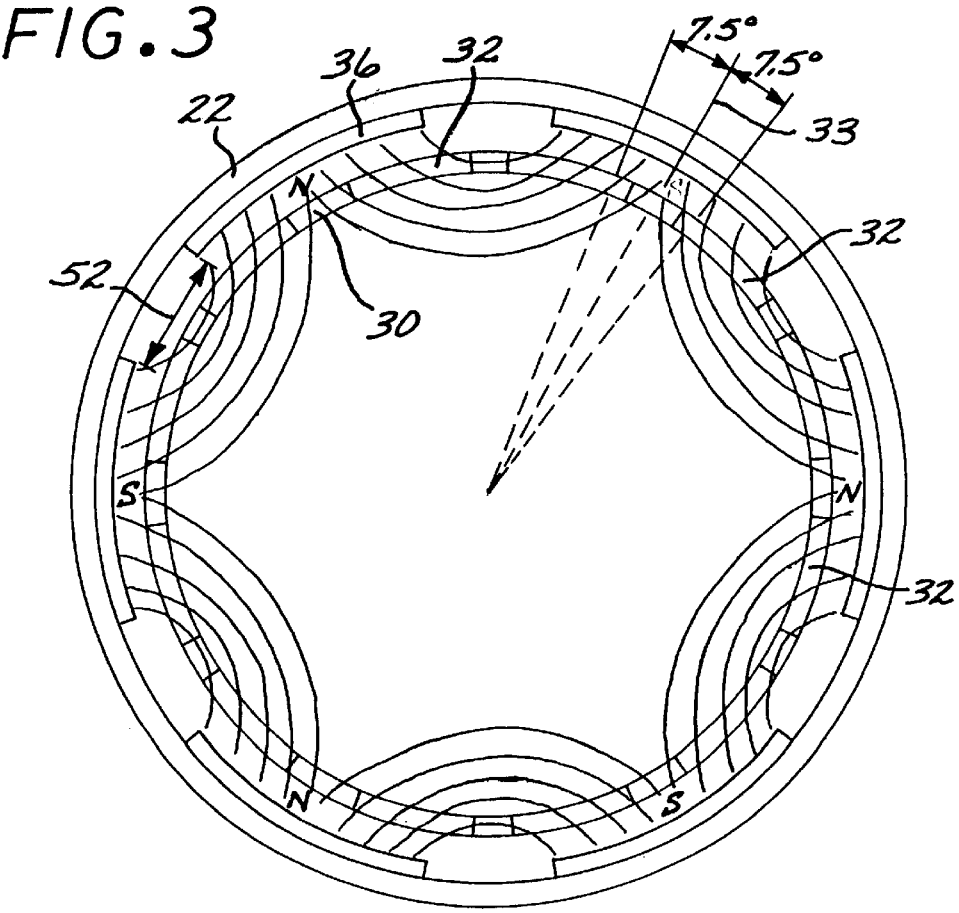
FIG. 3 is a schematic sectional view, taken generally along lines 3—3 of FIG. 2, of the torque motor of FIG. 1.

FIG. 3 is a section through the torque motor 20, illustrating the relation of the support base, rotor ring, and magnets for the preferred case of six permanent magnets 36 and six electromagnets 32, as well as the magnetic lines of force produced by the permanent magnets 36. The six permanent magnets 36 and the six electromagnets 32 are arranged in a sixfold-symmetrical fashion on their respective supports. Each permanent magnet 36 preferably subtends from about 30° to about 50° of arc. A circumferential air gap 52 between the adjacent permanent magnets 36 can subtend as little as about 10° of arc or in some cases even less. The six permanent magnets 36 include three inwardly facing N (north)-polarized magnets and three inwardly facing, oppositely polarized S (south)-magnets, arranged alternatingly around the circumference of the rotor ring 22. These magnets produce a permanent magnetic field of the form schematically depicted in FIG. 3.

When energized, the poles of the electromagnets 32 intersected by these magnetic lines of force are driven in a rotational direction. The direction of rotation is determined by the polarization of the electric field applied to the electromagnets 32 by the power supply 28. It has been determined that the reaction of the rotor ring 22 is substantially linear over an angular rotation of about ±7.5° (15° total) for this preferred configuration of six symmetric magnet sets.

Figure 6:
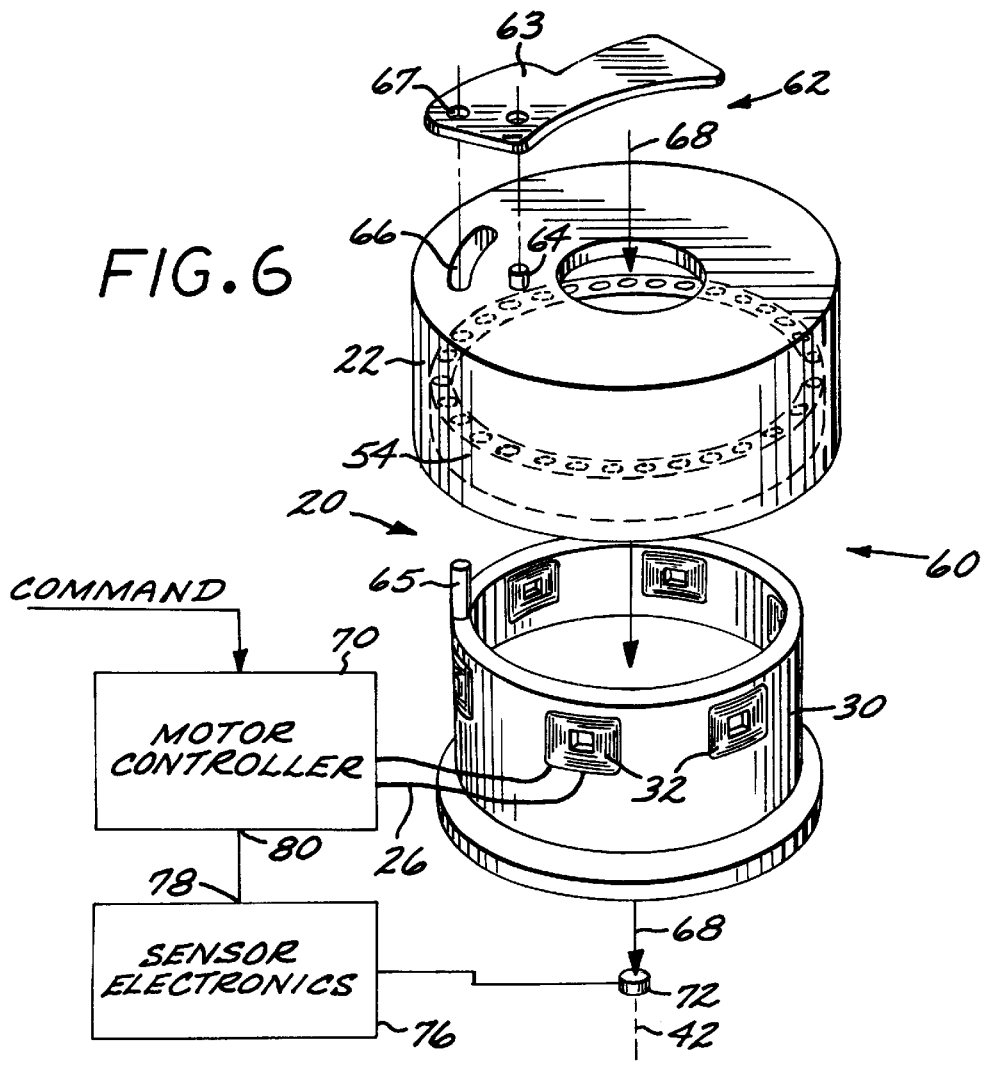
FIG. 6 is a schematic exploded perspective view of an optical iris system activated by the torque motor of FIG. 1.

FIG. 6 illustrates a control system 60 by which the torque motor 20 is used to drive a device, in this case a controllable iris 62. The iris 62 is of conventional design, including a number (typically five, but only one shown for clarity) of iris leaves 63, each of which is rotationally supported on a pivot pin 64 extending axially from the rotor ring 22. Driver pins 65 extend axially from the support base 30 and pass through slots 66 in the end of the rotor ring 22. The driver pins 65 engage driver pin bores 67 in the iris leaves 63. As the rotor ring 22 rotates relative to the support base 30 when a voltage is applied to the electromagnets 32, the iris leaves 63 are pivotably opened or closed by a selected amount, depending upon the direction and magnitude of rotation. A beam of light 68, which is to be attenuated by the opening or closing of the iris leaves 63, is coincident with the cylindrical axis 42 of the torque motor 20 (in this case, the support base 30 is made hollow). In this embodiment, a set of bearings 54 extend directly between the rotor ring 22 and the support base 30. One of the rotor ring 22 and the support base 30 is supported within the barrel of an optical assembly, and the other is allowed to rotate.

A motor controller 70 includes a power supply (28) as described previously, and an input command channel. A constant or controllable intensity feedback control is illustrated by way of example of the types of apparatus configurations possible with the control system 60. A light sensor 72 is placed so as to measure the total intensity of the light beam 68 passing through the iris 62. The output signal of the light sensor 72 is provided to sensor electronics 76, which produces a control signal output 78 which is responsive to the signal produced by the light sensor 72. The control signal output 78 is provided to the motor controller 70 as a control signal input 80, thereby completing a feedback loop by which the iris leaves 63 are moved so as to vary the total amount of light passing through the iris 62. The motor controller 70 compares the control signal input 80 to a command input, and varies the voltage applied to the electromagnets 32 accordingly.

A prototype control system 60 has been built and operated by the inventor.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A torque motor, comprising:
    a generally cylindrical support base;
    at least one multi-turn electromagnet flat coil affixed to a cylindrical outer circumferential surface of the support base the turns of each coil being turned about a radial ray extending from the center of the cylindrical support base through the cylindrical outer circumferential surface of the support base;
    an annular ferromagnetic rotor ring overlying the support base and rotationally movable with respect to the support base; and
    at least two permanent magnets affixed to the rotor ring, there being an even number of permanent magnets,
    the at least two permanent magnets being arranged in alternating north and south polarities around a circumference of the rotor ring in a facing relationship to the support base with a gap between each adjacent pair of north and south poles.

2. The torque motor of claim 1, wherein the support base is annular and has an opening therethrough, and the at least one electromagnet coil is supported in the opening.

3. The torque motor of claim 1, wherein the support base has an outer surface, and the at least one electromagnet coil is affixed to the outer surface of the support base.

4. The torque motor of claim 1, wherein the rotor ring has an inner surface, and the at least two permanent magnets are affixed to the inner surface of the rotor ring.

5. The torque motor of claim 1, wherein the rotor ring is generally in the form of a hollow cylinder.

6. The torque motor of claim 1, wherein the at least two permanent magnets are supported equidistantly around a cylindrical circumference of the rotor ring.

7. The torque motor of claim 6, wherein each one of the permanent magnets subtends an arc of from about 30 degrees to about 50 degrees around the cylindrical circumference of the rotor ring.

8. The torque motor of claim 1, wherein there are six permanent magnets positioned equidistantly around a circumference of the rotor ring and six electromagnet coils positioned equidistantly around a circumference of the support base.

9. A torque motor, comprising:

a generally cylindrical support base;

a plurality of multi-turn electromagnet flat coils affixed to the support base at regular intervals around a cylindrical outer circumferential surface of the support base, the turns of each coil being turned about a radial ray extending from the center of the cylindrical support base through the cylindrical outer circumferential surface of the support base;

an annular, generally cylindrical ferromagnetic rotor ring overlying the support base and rotationally movable with respect to the support base, the rotor ring having an inner surface; and a plurality of permanent magnets affixed to the inner surface of the rotor ring at regular intervals around a cylindrical circumference of the rotor ring, the number of permanent magnets being even and equal to the number of electromagnetic coils, the permanent magnets being arranged in alternating north and south polarities around the circumference of the rotor ring with a gap between each adjacent pair of north and south poles.

10. The torque motor of claim 9, wherein there are six permanent magnets and six electromagnet coils.

11. The torque motor of claim 10, wherein each of the six permanent magnets subtends an arc of from about 30 degrees to about 50 degrees.

12. The torque motor of claim 9, further including a rotational bearing upon which the rotor ring is supported.

13. A control system, comprising:

an iris having leaves that are opened or closed by a rotational movement; and a torque motor operatively connected for rotational movement to the leaves of the iris, the torque motor comprising:

a generally cylindrical support base;

at least one multi-turn electromagnet flat coil affixed to a cylindrical outer circumferential surface of the support base the turns of each coil being turned about a radial ray extending from the center of the cylindrical support base through the cylindrical outer circumferential surface of the support base;

an annular, rotationally movable ferromagnetic rotor ring overlying the support base and rotationally movable with respect to the support base; and at least two permanent magnets affixed to an inner cylindrical surface of the rotor ring in a generally facing relationship to the support base, there being an even number of permanent magnets, the at least two permanent magnets being arranged in alternating polarities around the inner cylindrical surface of the rotor ring.

14. The control system of claim 13, further including a feedback controller comprising a radiation sensor disposed to sense the radiation sensor passing through the iris and having an output responsive to the amplitude of the radiation, and a feedback controller receiving as an input the output of the radiation sensor and having as an output a signal to the torque motor to control the operation thereof.

15. The control system of claim 13, wherein the at least two permanent magnets comprises a plurality of permanent magnets affixed to the inner cylindrical surface of the rotor ring at regular intervals around a cylindrical circumference of the rotor ring, the number of permanent magnets being equal to the number of electromagnet coils, and wherein each one of the permanent magnets subtends an arc of from about 30 degrees to about 50 degrees around the cylindrical circumference of the rotor ring.

16. The control system of claim 13, wherein the support base is annular and has an opening therethrough, and the at least one electromagnet coil is supported in the opening.

17. The control system of claim 13, wherein the support base has an outer surface, and the at least one electromagnet coil is affixed to the outer surface of the support base.

18. The control system of claim 13, wherein there are six permanent magnets positioned equidistantly around a circumference of the rotor ring and six electromagnet coils positioned equidistantly around a circumference of the support base, and wherein each one of the permanent magnets subtends an arc of from about 30 degrees to about 50 degrees around the cylindrical circumference of the rotor ring.

19. The control system of claim 13, further including a motor controller having a voltage output in communication with each of the at least one electromagnetic coils, a sensor that monitors a light beam passing through the iris, and a sensor electronics receiving as an input the output of the sensor and having as an output a control signal to the motor controller.

20. The control system of claim 13, wherein the rotor ring is made of a ferromagnetic material.

21. The control system of claim 13, wherein the permanent magnets are arranged in alternating north and south polarities around the circumference of the rotor ring with a gap between each adjacent pair of north and south poles.

* * * * *